(12) United States Patent
Wada

(10) Patent No.: US 12,537,050 B2
(45) Date of Patent: Jan. 27, 2026

(54) MEMORY DEVICE AND SENSE AMPLIFIER CONTROL CIRCUIT FOR OFFSET CANCELLATION

(71) Applicant: Kioxia Corporation, Tokyo (JP)

(72) Inventor: Masaharu Wada, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 447 days.

(21) Appl. No.: 18/061,827

(22) Filed: Dec. 5, 2022

(65) Prior Publication Data

US 2023/0402088 A1 Dec. 14, 2023

(30) Foreign Application Priority Data

Jun. 9, 2022 (JP) ................. 2022-093593

(51) Int. Cl.
*G11C 7/10* (2006.01)
*G11C 11/4074* (2006.01)
*G11C 11/4076* (2006.01)
*G11C 11/4093* (2006.01)

(52) U.S. Cl.
CPC ...... *G11C 11/4093* (2013.01); *G11C 11/4074* (2013.01); *G11C 11/4076* (2013.01)

(58) Field of Classification Search
CPC ............ G11C 11/4093; G11C 11/4074; G11C 11/4076; G11C 7/08; G11C 11/4091; G11C 7/065
See application file for complete search history.

(56) References Cited

U.S. PATENT DOCUMENTS

| 10,658,014 B2 | 5/2020 | Lee et al. |
| 10,950,279 B2 | 3/2021 | Jeong et al. |
| 2008/0159024 A1* | 7/2008 | Park ................. G11C 11/4091 365/194 |
| 2013/0039136 A1* | 2/2013 | Yoshida ............. G11C 11/4091 365/194 |
| 2013/0272060 A1* | 10/2013 | Andre ................ G11C 11/1693 365/158 |
| 2020/0312385 A1* | 10/2020 | Oak .................... G11C 7/12 |
| 2021/0184871 A1 | 6/2021 | Kim |
| 2023/0071414 A1* | 3/2023 | Chi .................... G11C 7/06 |

FOREIGN PATENT DOCUMENTS

JP 2019-061733 A 4/2019

* cited by examiner

*Primary Examiner* — Mushfique Siddique
(74) *Attorney, Agent, or Firm* — Foley & Lardner LLP

(57) ABSTRACT

A first inverter includes second and third transistors coupled at a third node. A second inverter includes fourth and fifth transistors coupled at a fourth node. A sixth transistor is between the fifth transistor's gate and the third node. A seventh transistor is between the third transistor's gate and the fourth node. An eighth transistor is between the third transistor's gate and the third node. A ninth transistor is between the fifth transistor's gate and the fourth node. A voltage of the eighth and ninth transistors' gates lowers at a first time. A state is formed with voltages applied to first and second nodes of the first and second inverters at a second time. A voltage of the sixth and seventh transistors' gates rises between the first and second times.

4 Claims, 11 Drawing Sheets

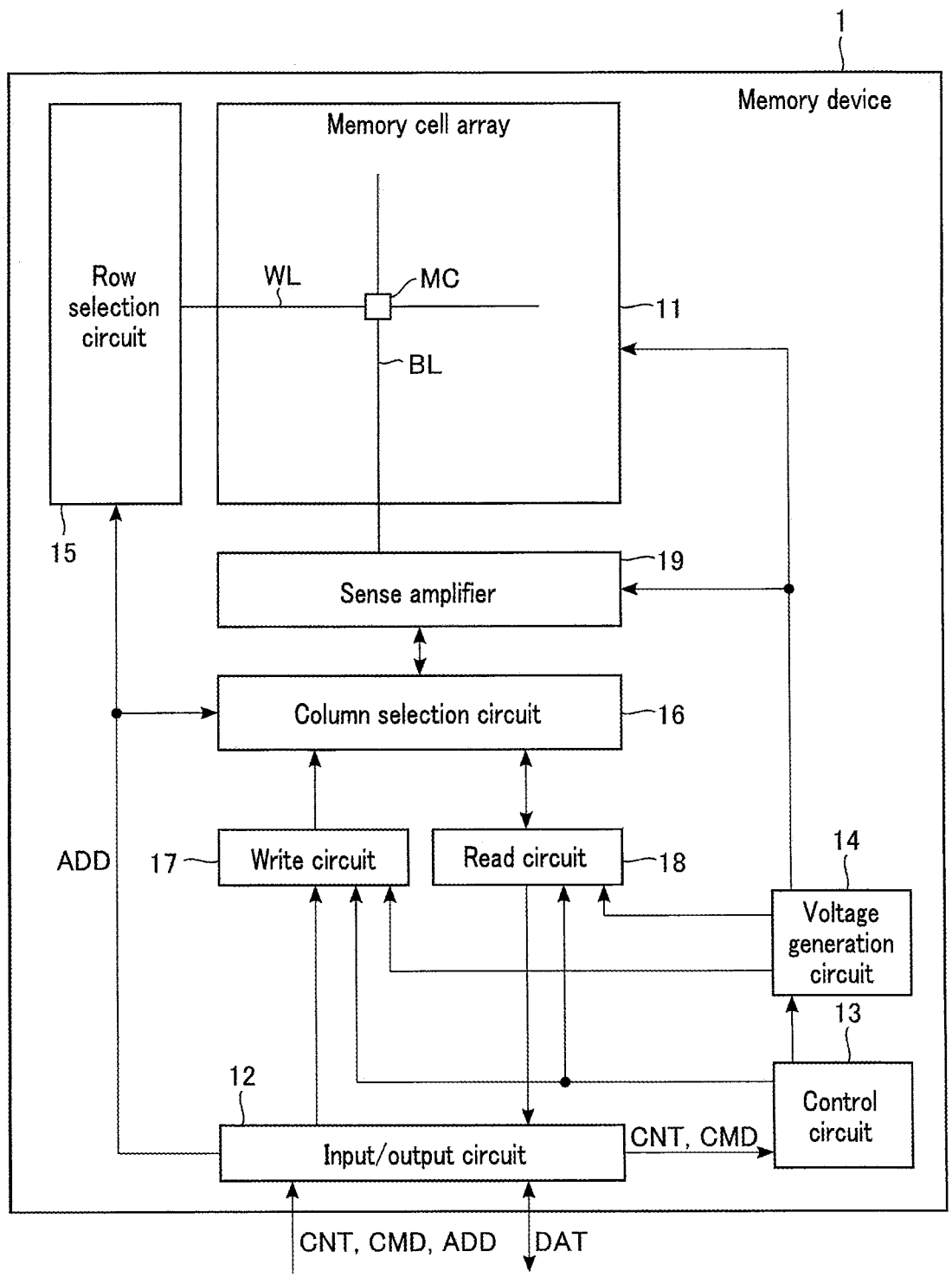
F I G. 1

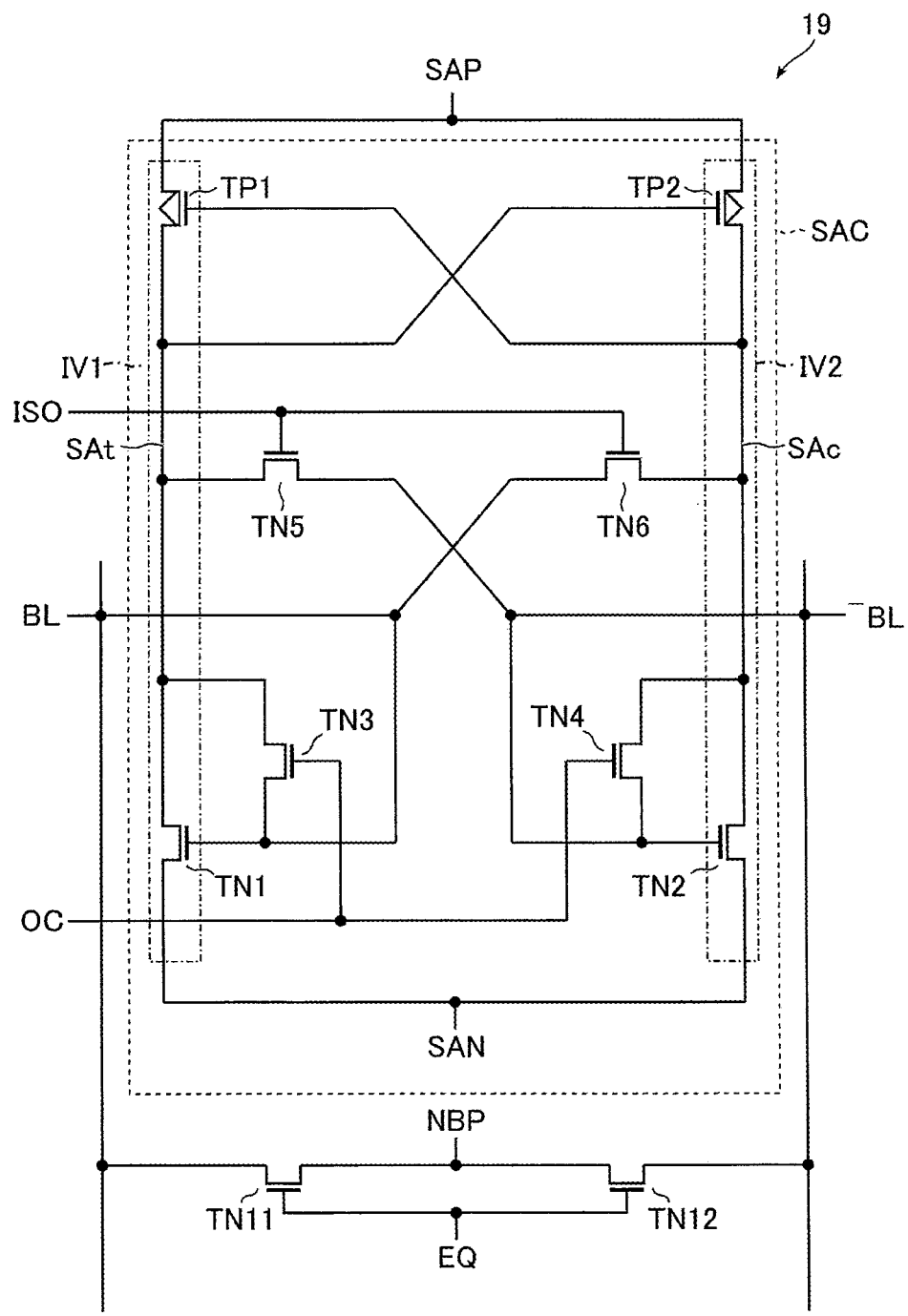
F I G. 3

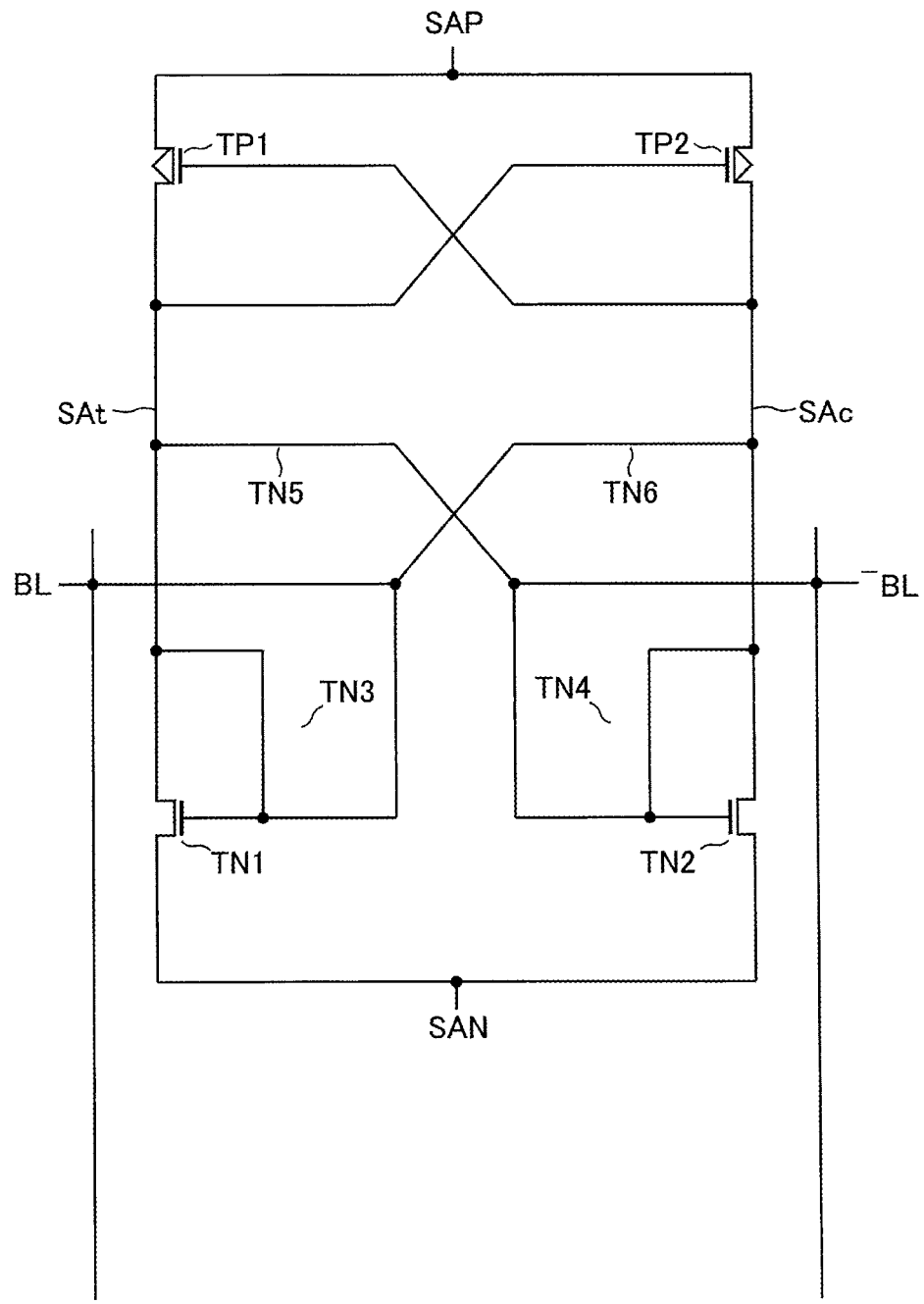
F I G. 7

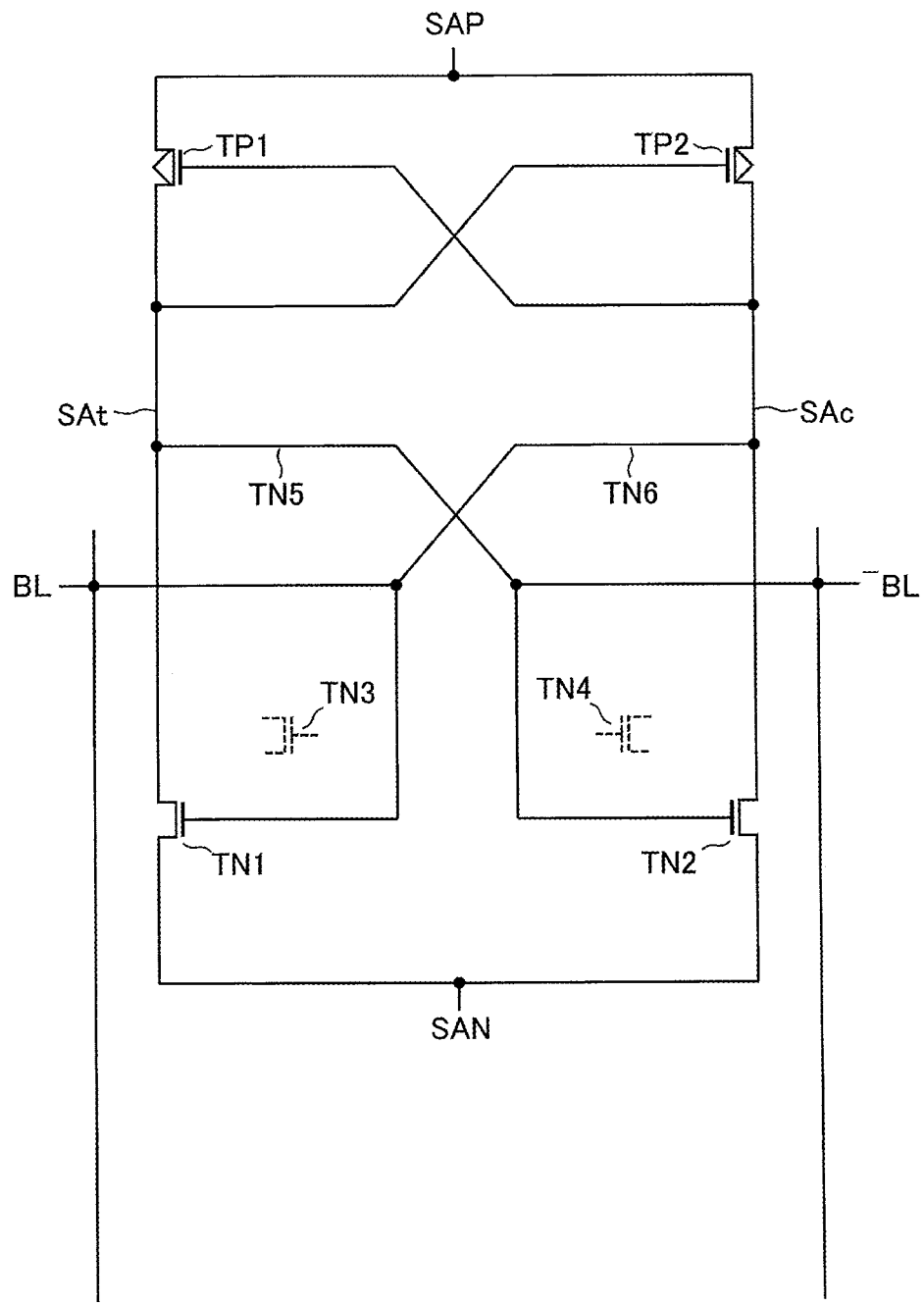
F I G. 9

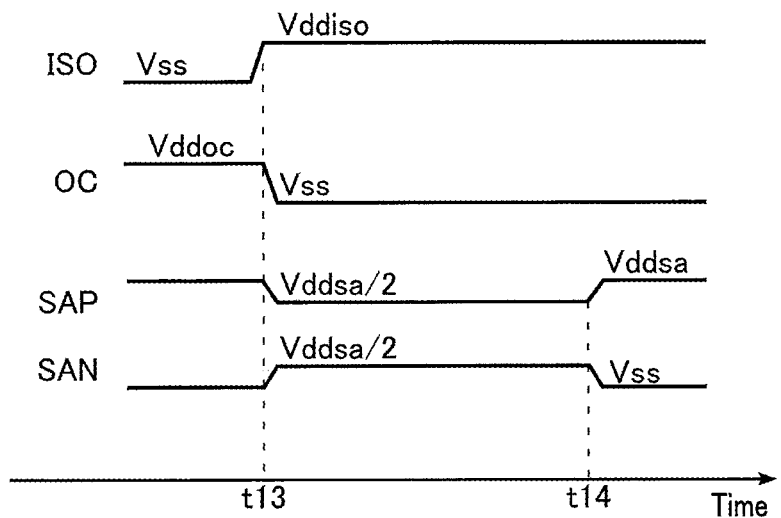
F I G. 11
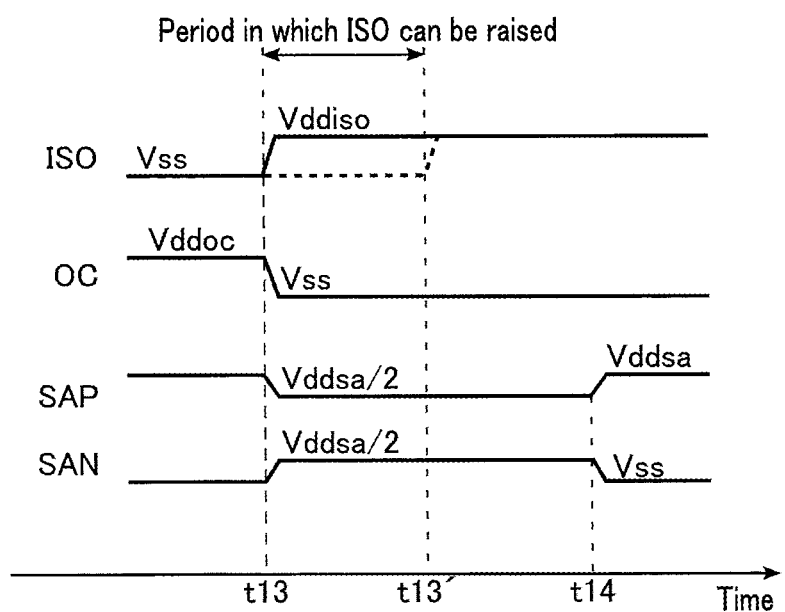
F I G. 12

MEMORY DEVICE AND SENSE AMPLIFIER CONTROL CIRCUIT FOR OFFSET CANCELLATION

CROSS-REFERENCE TO RELATED APPLICATIONS

This application is based upon and claims the benefit of priority from Japanese Patent Application No. 2022-093593, filed Jun. 9, 2022, the entire contents of which are incorporated herein by reference.

FIELD

Embodiments described herein relate generally to memory devices.

BACKGROUND

As a memory device, a dynamic random access memory (DRAM) is known. A memory cell of the DRAM includes a capacitor and a transistor. The memory cell stores data, based on the charge stored in the capacitor. The potential based on the data stored in a memory cell of a data read target is amplified by a sense amplifier, and the stored data is determined thereby.

BRIEF DESCRIPTION OF THE DRAWINGS

FIG. 1 shows functional blocks of a memory device according to a first embodiment and components relevant thereto.

FIG. 3 shows components of part of a sense amplifier according to the first embodiment and coupling of the components.

FIG. 7 schematically shows coupling of components of a sense amplifier circuit of the memory device during equalization according to the first embodiment.

FIG. 9 schematically shows coupling of the components of the sense amplifier circuit of the memory device during charge sharing according to the first embodiment.

FIG. 11 schematically shows, along a timeline, potentials of some components of the memory device for reference during data reading.

FIG. 12 schematically shows, along a timeline, potentials of some components of a memory device during data reading according to a modification of the first embodiment.

DETAILED DESCRIPTION

Figure 2:
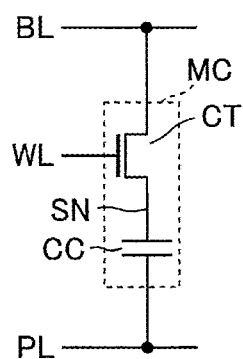
FIG. 2 shows components of a memory cell according to the first embodiment and coupling of the components.

In general, according to one embodiment, memory device includes a capacitor, a first transistor, a first inverter circuit, a second inverter circuit, a sixth transistor, a seventh transistor, an eighth transistor, a ninth transistor coupled between the gate of the fifth transistor and the fourth node. The first transistor is coupled to the capacitor at a first end. The first inverter circuit is coupled between a first node and a second node and includes a p-type second transistor and an n-type third transistor that are coupled in series at a third node. The second inverter circuit is coupled between the first node and the second node and includes a p-type fourth transistor and an n-type fifth transistor that are coupled in series at a fourth node. The sixth transistor is coupled between a gate of the fifth transistor and the third node. The seventh transistor is coupled between a gate of the third transistor and the fourth node and between a second end of the first transistor and the fourth node. The eighth transistor is coupled between the gate of the third transistor and the third node. The ninth transistor is coupled between the gate of the fifth transistor and the fourth node. A voltage applied to a gate of the eighth transistor and a gate of the ninth transistor is lowered at a first time. A state is formed in which a first voltage is applied to the first node and a second voltage lower than the first voltage is applied to the second node at a second time. A voltage applied to a gate of the sixth transistor and a gate of the seventh transistor is raised between the first time and a third time, which is halfway between the first time and the second time.

Embodiments will now be described with reference to the figures. In order to distinguish components having substantially the same function and configuration in an embodiment or over different embodiments from each other, an additional numeral or letter may be added to the end of each reference numeral or letter. For an embodiment subsequent to an embodiment that has already been described, the description will concentrate mainly on the matters that constitute a difference from the already described embodiment. The entire description of a particular embodiment applies to another embodiment unless an explicit mention is made otherwise, or an obvious elimination is involved.

The specification and the claims, when mentioning that a particular (first) component is "coupled" to another (second) component, intend to cover both the form of the first component directly coupled to the second component and the form of the first component coupled to the second component via one or more components which are always or selectively conductive.

1. First Embodiment

1. 1. Structure (Configuration)

FIG. 1 shows a functional block of a memory device according to a first embodiment. The memory device 1 is a device that stores data. The memory device 1 includes a memory cell array 11, an input/output circuit 12, a control circuit 13, a voltage generation circuit 14, a row selection circuit 15, a column selection circuit 16, a write circuit 17, a read circuit 18, and a sense amplifier 19.

The memory cell array 11 includes a plurality of memory cells MC, a plurality of word lines WL, and a plurality of bit lines BL. Each memory cell MC is capable of storing 1-bit data. Each memory cell MC is coupled to a single bit line BL and a single word line WL. The memory cell MC is coupled between the bit line BL and the plate line (not illustrated). The word line WL is associated with a row. The bit line BL is associated with a column. Through selection of a single row and a single column, a single memory cell MC is designated.

The input/output circuit 12 is a circuit that inputs and outputs data and signals. The input/output circuit 12 receives, from outside the memory device 1, e.g., from a memory controller, a control signal CNT, a command CMD, an address signal ADD, and data DAT. The input/output circuit 12 outputs data DAT. The data DAT is data to be written in the case of data writing in the memory device 1. The data DAT is read data in the case of data reading from the memory device 1.

The control circuit 13 is a circuit that controls the operation of the memory device 1. The control circuit 13 receives a command CMD and a control signal CNT from the input/output circuit 12. The control circuit 13 controls the write circuit 17 and the read circuit 18 based on control instructed by the command CMD and the control signal CNT.

The voltage generation circuit 14 is a circuit that generates various voltages used in the memory device 1. The voltage generation circuit 14 generates multiple voltages with different magnitudes under the control of the control circuit 13. The voltage generation circuit 14 supplies the generated voltages to the memory cell array 11, the write circuit 17, the read circuit 18, and the sense amplifier 19.

The row selection circuit 15 is a circuit that selects a row of a memory cell MC. The row selection circuit 15 receives an address signal ADD from the input/output circuit 12. The row selection circuit 15 makes a single word line WL associated with a row designated by the received address signal ADD a selected state, using a voltage received from the voltage generation circuit 14.

The column selection circuit 16 is a circuit that selects a column of a memory cell MC. The column selection circuit 16 receives an address signal ADD from the input/output circuit 12. The column selection circuit 16 makes a bit line BL associated with a column designated by the received address signal ADD a selected state, using a voltage received from the voltage generation circuit 14.

The write circuit 17 is a circuit that performs processing and control for writing data into the memory cells MC. The write circuit 17 receives data to be written from the input/output circuit 12. The write circuit 17 supplies, based on the control and data of the control circuit 13, the voltage received from the voltage generation circuit 14 to the column selection circuit 16.

The read circuit 18 is a circuit that performs processing and control for reading data from the memory cells MC. The read circuit 18 determines data stored in the memory cell MC based on the control of the control circuit 13. The determined data is supplied to the input/output circuit 12. The read circuit supplies control signals to the sense amplifier 19.

The sense amplifier 19 is a circuit for determining data stored in the memory cell MC. The sense amplifier 19 includes a plurality of sense amplifier circuits SAC (not illustrated). The sense amplifier 19 receives multiple voltages from the voltage generation circuit 14, and operates using the received voltages. During data reading, the sense amplifier 19 amplifies a potential of a bit line BL to determine data stored in the memory cell MC of a data read target.

1. 1. 1. Memory Cells

FIG. 2 shows components of the memory cell according to the first embodiment and coupling of the components. As shown in FIG. 2, each memory cell MC includes a cell capacitor CC and an n-type metal-oxide-semiconductor field-effect transistor (MOSFET) CT. The cell capacitor CC is coupled to, at one end, a plate line PL, and is coupled to, at another end, one end of the transistor CT. The cell capacitor CC stores data using a charge stored in a node coupled to the transistor CT. A node of the cell capacitor CC that is coupled to the transistor CT may be hereinafter referred to as a "storage node SN".

Whether or not the storage node SN stores a charge is associated with a state in which the memory cell MC stores "1" data, or a state in which "0" data is stored. Hereinafter, as an example, the state in which the storage node SN is relatively positively charged will be treated as a state in which the memory cell MC stores "1" data, and the state in which the storage node SN is not relatively positively charged will be treated as a state in which the memory cell MC stores "0" data.

The transistor CT is coupled to, at the other end, a single bit line BL, and is coupled to, at its gate, a single word line WL.

1. 1. 2. Sense Amplifier

FIG. 3 shows components of part of the sense amplifier 19 according to the first embodiment and coupling of the components. As described above, the sense amplifier 19 includes a plurality of sense amplifier circuits SAC. In FIG. 3, a single sense amplifier circuit SAC is shown.

As shown in FIG. 3, each sense amplifier circuit SAC is coupled to a single bit line BL and a node ⁻BL. The node ⁻BL may be hereinafter referred to as a "complementary bit line ⁻BL". The "complementary bit line ⁻BL" functions as a node having a reference potential. The reference potential is used to determine data stored in a memory cell MC of a data read target.

The sense amplifier circuit SAC includes p-type MOSFETs TP1 and TP2 and n-type MOSFETs TN1 to TN6. The sense amplifier 19 further includes transistors TN11 and TN12.

The transistor TP1 is coupled between a node SAP and a node SAt. The node SAP receives a voltage from, for example, the voltage generation circuit 14. The node SAP receives one of multiple voltages including a power-supply voltage Vddsa and a voltage Vddsa/2 that is dynamically switched. The power-supply voltage Vddsa may have a magnitude identical to or different from that of the power-supply voltage Vdd used in the memory device 1. The transistor TP1 is coupled to, at its gate, a node SAc. The transistor TP1 has a certain level of ON resistance while it is on. The ON resistance of a transistor is a resistance of the transistor while it is ON.

The transistor TN1 is coupled between the node SAt and a node SAN. The node SAN receives a voltage from, for example, the voltage generation circuit 14. The node SAN receives one of multiple voltages including the power-supply voltage Vddsa/2 and a ground voltage (common voltage) Vss that is dynamically switched. The ground voltage Vss is, for example, 0 V, and the description that follows is based on this example. The transistor TN1 is coupled to, at its gate, a single bit line BL. The transistor TN1 has a certain level of ON resistance.

The transistor TP2 is coupled between the node SAP and a node SAc. The transistor TP2 is coupled to, at its gate, the node SAt. The transistor TP2 has an ON resistance of a magnitude that is substantially identical to that of the transistor TP1. Herein, characteristics of two components being "substantially the same" means permitting cases where the two components are formed in an attempt to be the same, but are not completely the same due to unavoidable reasons such as technical limitations for forming the components and/or limitations on technique for measuring.

The transistor TN2 is coupled between the node SAc and the node SAN. The transistor TN2 is coupled to, at its gate, the complementary bit line ⁻BL. The transistor TN2 has an ON resistance of a magnitude that is substantially identical to that of the transistor TN1.

The transistor TN3 is coupled between the node SAt and a gate of the transistor TN1. The transistor TN3 receives, at its gate, a signal OC. The signal OC is supplied from, for example, the read circuit 18.

The transistor TN4 is coupled between the node SAc and a gate of the transistor TN2. The transistor TN4 receives, at its gate, the signal OC.

The transistor TN5 is coupled between the node SAt and the complementary bit line ⁻BL. The transistor TN5 receives, at its gate, a signal ISO. The signal ISO is supplied from, for example, the read circuit 18. The transistor TN5 has, for example, dimensions that are substantially identical to those of the transistor TN3. In the case of this example, a parasitic capacitance between one of the source and drain of the transistor TN5 and its gate is substantially the same as that between one of the source and drain of the transistor TN3 and its gate.

The transistor TN6 is coupled between the node SAc and the bit line BL. The transistor TN6 receives, at its gate, the signal ISO. The transistor TN6 has, for example, dimensions that are substantially identical to those of the transistor TN4. In the case of this example, a parasitic capacitance between one of the source and drain of the transistor TN6 and its gate is substantially the same as that between one of the source and drain of the transistor TN4 and its gate.

The transistor TN11 is coupled between at least one of the bit lines BL and a node NBP. The node NBP receives a pre-charge voltage Vpc from the voltage generation circuit 14. The pre-charge voltage Vpc, which is obtained by (Vddsa−Vss)/2, is Vddsa/2 based on an example in which Vss is 0 V, and also functions as a reference voltage. The transistor TN11 receives, at its gate, a signal EQ. The signal EQ is supplied from, for example, the read circuit 18.

The transistor TN12 is coupled between at least one of the complementary bit lines ⁻BL and the node NBP. The transistor TN12 receives, at its gate, the signal EQ.

The transistors TP1 and TN1 configure an inverter circuit IV1, and the transistors TP2 and TN2 configure an inverter circuit IV2. While the transistors TN5 and TN6 are ON, the inverter circuit IV1 and the inverter circuit IV2 are "cross-coupled". That is, an input node and an output node of the inverter circuit IV1 are respectively coupled to an output node and an input node of the inverter circuit IV2.

1. 1. 3. Read Circuit

Figure 4:
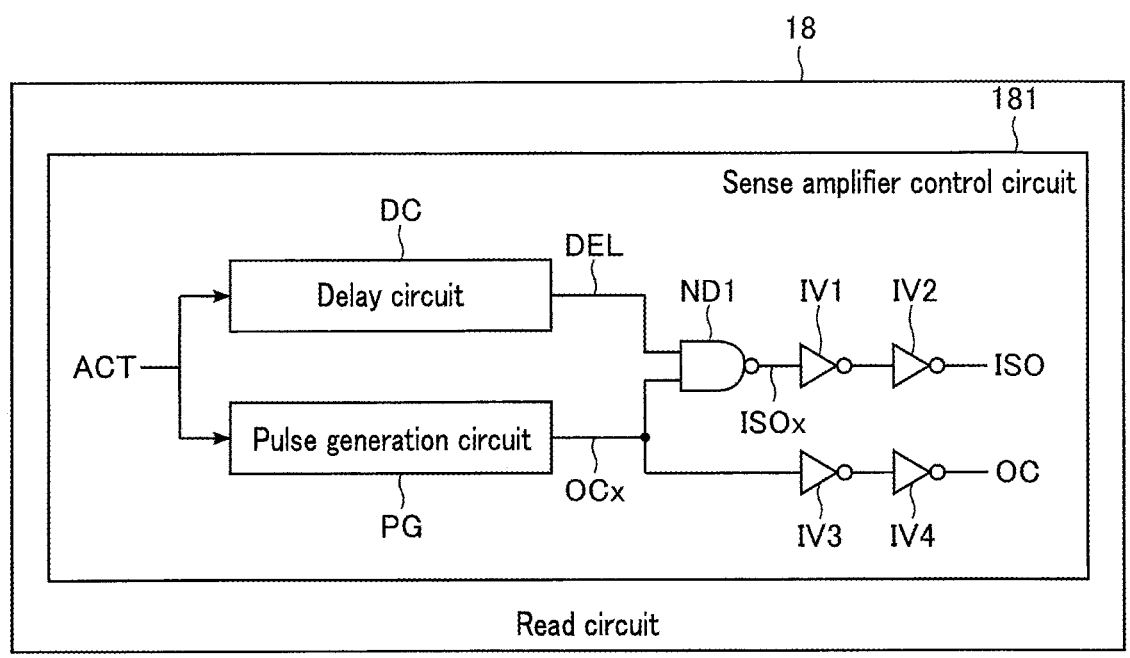
FIG. 4 shows components of a read circuit of the memory device according to the first embodiment and coupling of the components.

FIG. 4 shows components of the read circuit of the memory device according to the first embodiment and coupling of the components. As shown in FIG. 4, the read circuit 18 includes a sense amplifier control circuit 181. The sense amplifier control circuit 181 includes a delay circuit DC, a pulse generation circuit PG, a NAND gate ND1, and an even number of inverter circuits, for example, four inverter circuits IV1 to IV4.

The delay circuit DC is a circuit that outputs a signal obtained by delaying a signal received by the delay circuit DC. The delay circuit DC receives a digital signal ACT. The signal ACT is, for example, generated by another component in the read circuit 18 based on a command for instructing data reading that is received by the memory device 1. Upon receiving the signal ACT, the delay circuit DC begins to output a digital signal DEL at a time when a predetermined time passes from the time when the signal ACT was received. A logic level of the signal DEL follows a logic level of the signal ACT, and after a delay time passes, transitions following a transition of the logic level of the signal ACT.

The pulse generation circuit PG is a circuit that generates pulse signals based on signal reception. The pulse generation circuit PG receives the signal ACT. Upon receiving the signal ACT, the pulse generation circuit PG outputs a digital signal OCx. The signal OCx remains high for a predetermined period of time.

The NAND gate ND1 receives the signals DEL and OCx, and outputs a digital signal ISOx. The output of the NAND gate ND1 is coupled to an even number of inverter circuits coupled in series. FIG. 4 shows an example of two inverter circuits IV1 and IV2. The inverter circuit IV1 receives the signal ISOx, and is coupled, at its output, to the input of inverter circuit IV2. The inverter circuit IV2 outputs a digital signal ISO.

The output of the pulse generation circuit PG is coupled to an even number of inverter circuits coupled in series. A set of inverter circuits coupled in series to the pulse generation circuit PG consists of the same number of inverter circuits as the number of inverter circuits coupled in series to the NAND gate ND1. Based on the example of the inverter circuits IV1 and IV2 coupled to the NAND gate ND1, the pulse generation circuit PG is coupled to two inverter circuits IV3 and IV4 coupled in series. The inverter circuit IV3 receives the signal OCx, and is coupled, at its output, to the input of the inverter circuit IV4. The inverter circuit IV4 outputs a digital signal OC.

1. 2. Operation 1. 2. 1. Sense Amplifier Control Circuit

Figure 5:
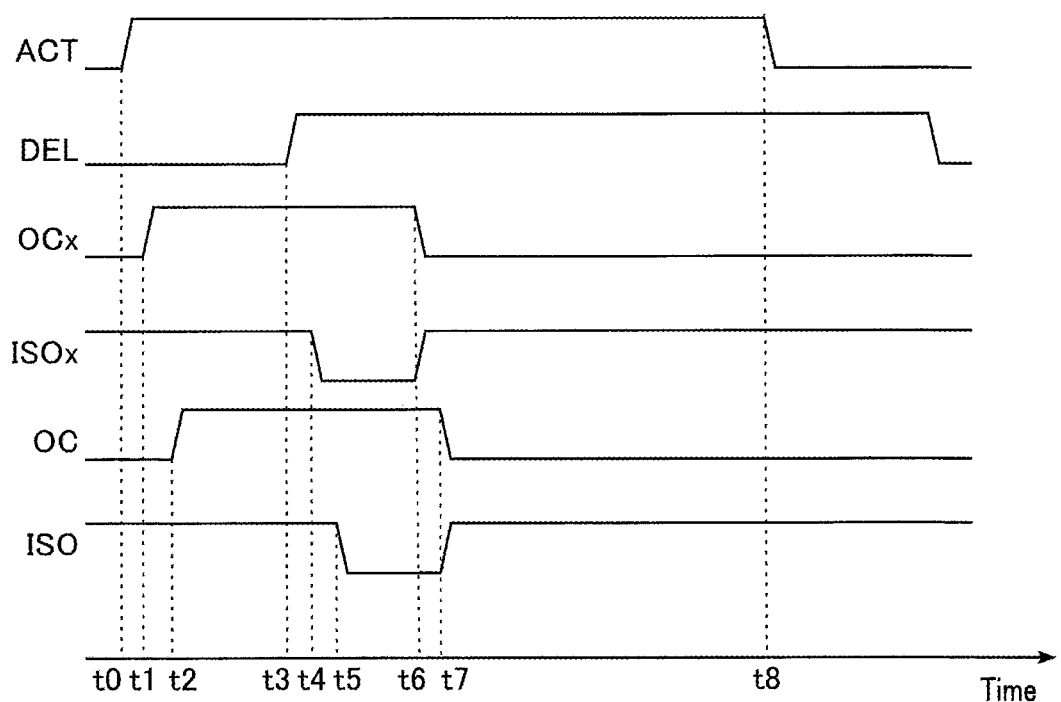
FIG. 5 shows, along a timeline, waveforms of signals in a sense amplifier control circuit of the memory device according to the first embodiment.

FIG. 5 shows, along a timeline, waveforms of signals in the sense amplifier control circuit of the memory device according to the first embodiment. In the following description, the level of a signal is maintained until the time at which it is described that this signal transitions to another level.

At the start of the period in FIG. 5, the signal ACT has a low level. At time t0, the signal ACT is brought to a high level. Based on the signal ACT transitioning to a high level, the signal OCx transitions to a high level at time t1. Based on the signal OCx transitioning to a high level, the signal OC transitions to a high level at time t2. An interval between time t1 and time t2 depends on the number of inverter circuits (the inverter circuits IV3 and IV4 in the example of FIG. 4) coupled in series to the pulse generation circuit PG.

Based on the signal ACT transitioning to a high level at time t0, the signal DEL transitions to a high level at time t3. An interval between time t0 and time t3 coincides with a delay time that the delay circuit DC has.

Based on the signal DEL transitioning to a high level at time t3, the signal ISOx transitions to a low level at time t4. Based on the signal ISOx transitioning to a low level, the signal OC transitions to a low level at time t5. An interval between time t4 and time t5 depends on the number of inverter circuits (the inverter circuits IV1 and IV2 in the example of FIG. 4) coupled in series to the NAND gate ND1.

At time t6, the signal OCx transitions to a low level. A width of a pulse at a high level of the signal OCx, i.e., an interval between time t1 and time t6, depends on an interval defined in the pulse generation circuit PG.

Based on the signal OCx transitioning to a low level at time t6, the signal OC transitions to a low level at time t7. An interval between time t6 and time t7 depends on the number of inverter circuits (the inverter circuits IV3 and IV4 in the example of FIG. 4) coupled in series to the NAND gate ND1.

Based on the signal OCx transitioning to a low level at time t6, the signal ISOx transitions to a high level at time t6. Based on the signal ISOx transitioning to a high level at time t6, the signal ISO transitions to a high level at time t7. In this way, the signal ISO transitions to a high level at substantially the same timing that the signal OC transitions to a low level.

At time t8, the signal ACT is brought to a low level.

1. 2. 2. Sense Amplifier Circuit

Figure 6:
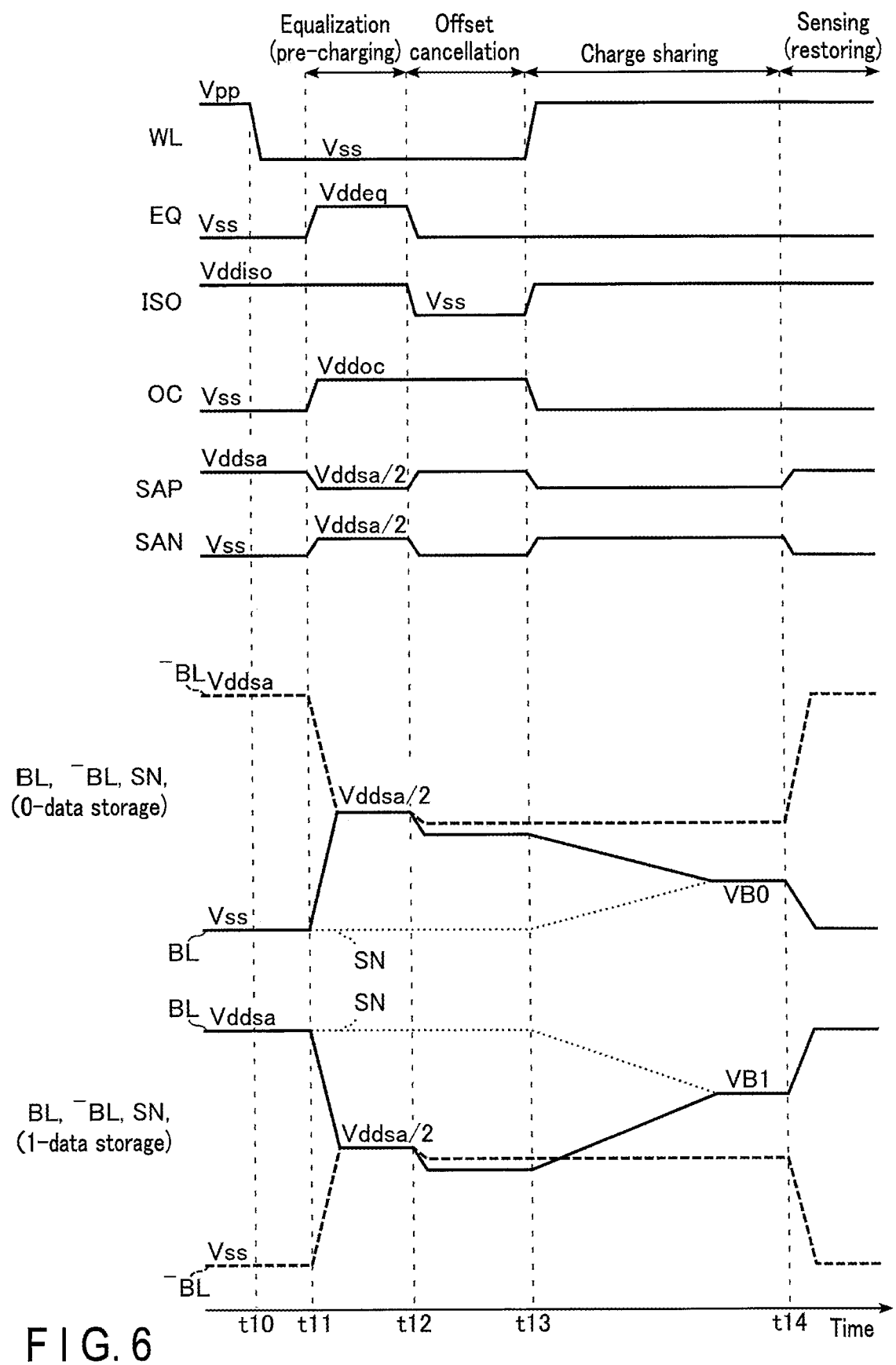
FIG. 6 schematically shows, along a timeline, potentials of some components of the memory device during data reading according to the first embodiment.

FIG. 6 shows, along a timeline, potentials of some components of the memory device during data reading according to the first embodiment, showing potentials of some interconnects, nodes, and signals. Hereinafter, a memory cell MC to be a data read target may be referred to as a "selected memory cell MC". A word line WL whose potential is shown in FIG. 6 is a word line WL coupled to the selected memory cell MC, and may be hereinafter referred to as a "selected word line WL". A bit line BL whose potential is shown in FIG. 6 is a bit line BL coupled to the selected memory cell MC during data reading, and may be hereinafter referred to as a "selected bit line BL". A complementary bit line ⁻BL coupled to a sense amplifier circuit SAC coupled to the selected bit line BL may be referred to as a "selected complementary bit line ⁻BL". Through application of a voltage to an illustrated interconnect or an interconnect that transmits a signal, this interconnect has substantially the same potential as the applied voltage. For example, in order for an interconnect to have a potential Vdd, a power-supply voltage Vdd is applied.

The potentials of the respective interconnects and nodes at the start of the period shown in FIG. 6 are as follows. The selected word line WL is asserted, namely, has a power-supply potential Vpp. The power-supply potential Vpp is an internal power-supply potential, and has, for example, a magnitude different from that of a potential (power-supply potential) Vdd of the power-supply voltage Vdd. Since the selected word line WL has the power-supply potential Vpp, the transistor CT of the selected memory cell MC is on, and the cell capacitor CC of the selected memory cell MC is coupled to the selected bit line BL.

A signal EQ is negated, namely, has a potential (ground potential) Vss of a ground voltage Vss. Thus, the transistors TN11 and TN12 are off, and neither the selected bit line BL nor the selected complementary bit line ⁻BL is coupled to the node NBP with a pre-charge voltage Vpc.

A signal ISO is asserted, namely, has a power-supply potential Vddiso. The power-supply potential Vddiso is an internal power-supply potential, and has, for example, a magnitude different from that of the power-supply potential Vdd. A transistor TN5 is on with the power-supply potential Vddiso at its gate, and the selected complementary bit line ⁻BL is coupled to the node SAt via the transistor TN5 that is turned on. Thus, the selected complementary bit line ⁻BL and the node SAt have substantially the same potential. The transistor TN6 is turned on with the power-supply potential Vddiso at its gate, and the selected bit line BL is coupled to the node SAc via the transistor TN6 that is on. Thus, the selected bit line BL and the node SAc have substantially the same potential.

A signal OC is negated, namely, has a ground potential Vss. The transistor TN3 is off with the ground potential Vss at its gate, and thus the gate of the transistor TN1 is decoupled from the node SAt. The transistor TN4 is off with the ground potential Vss at its gate, and thus the gate of the transistor TN2 is decoupled from the node SAc.

The node SAP has a power-supply potential Vddsa, and the node SAN has the ground potential Vss. Thus, with the supply of power, the sense amplifier circuit SAC is in an on state, namely, an operable state.

Based on such states of the potentials, one of the selected bit line BL and the selected complementary bit line ⁻BL has the power-supply potential Vddsa, and the other has the ground potential Vss. Which of the selected bit line BL and the selected complementary bit line ⁻BL has the power-supply potential Vddsa depends on whether the selected memory cell MC stores "0" data or "1" data.

When the selected memory cell MC stores "0" data, the selected bit line BL has the ground potential Vss, and the storage node SN has the ground potential Vss. On the other hand, when the selected memory cell MC stores "1" data, the selected bit line BL has the power-supply potential Vddsa, and the storage node SN has the power-supply potential Vddsa. Hereinafter, the case where the selected memory cell MC stores "0" data may be referred to as "0-data storage case", and the case where the selected memory cell MC stores "1" data may be referred to as "1-data storage case".

At time t10, the selected word line WL is negated, namely, the potential of the selected word line WL is brought to the ground potential Vss. Thus, the transistor CT of the selected memory cell MC is turned off, and the cell capacitor CC of the selected memory cell MC is decoupled from the selected bit line BL. The selected word line WL may have a negative potential instead of the ground potential Vss.

In the data reading, a period from time t11 to time t12 is an equalization period. At time t11, the potential of the node SAP is brought to a potential Vddsa/2, and the potential of the node SAN is brought to the potential Vddsa/2. Thus, the sense amplifier circuit SAC does not receive a power supply, and does not have a function of amplifying the potential. A voltage applied to the node SAP and the node SAN is (Vddsa+Vss)/2. However, since a case is assumed where the ground voltage Vss is 0 V as described above, the voltage that is applied is the voltage Vddsa/2.

At time T11, the signal EQ is asserted, namely, the potential of the signal EQ is brought to a power-supply potential Vddeq. The power-supply potential Vddeq is an internal power-supply potential, and has, for example, a magnitude different from that of the power-supply potential Vdd. With the application of the power-supply potential Vddeq, the transistors TN11 and TN12 are turned on, and the selected bit line BL and the selected complementary bit line ⁻BL are coupled to the node NBP. As a result, both the selected bit line BL and the selected complementary bit line ⁻BL are equalized to the same potential. Specifically, both the selected bit line BL and the selected complementary bit line ⁻BL are pre-charged to the potential of the pre-charge voltage Vpc, namely, the potential Vddsa/2.

Figure 8:
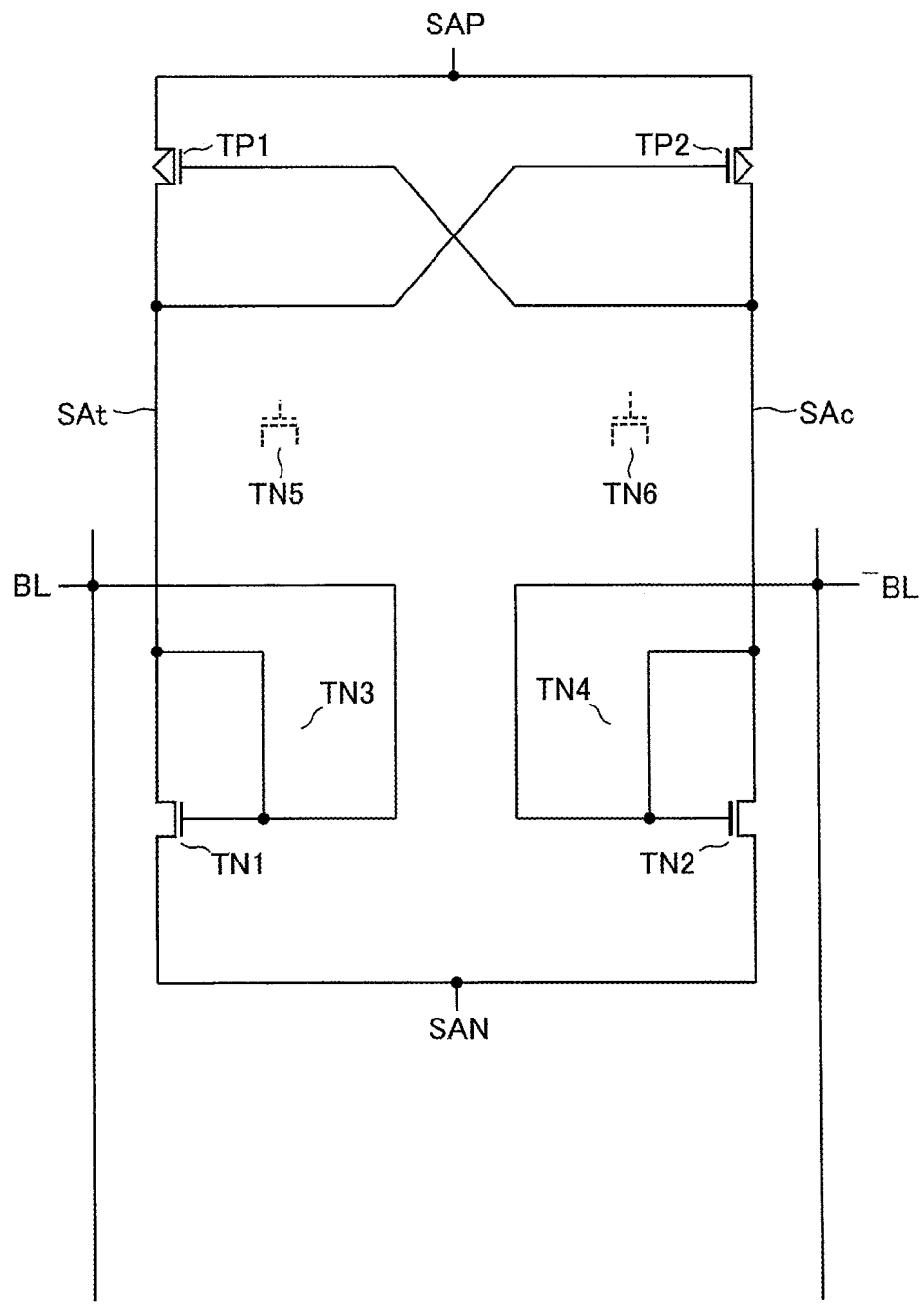
FIG. 8 schematically shows coupling of the components of the sense amplifier circuit of the memory device during offset cancellation according to the first embodiment.

At time t11, the signal OC is asserted, namely, the potential of the signal OC is brought to a power-supply potential Vddoc. The power-supply potential Vddoc is an internal power-supply potential, and has, for example, a magnitude different from that of the power-supply potential Vdd. The transistors TN3 and TN4 are on with the power-supply potential Vddoc at their gates. FIG. 7 schematically shows coupling of the components of the sense amplifier circuit SAC during equalization. In FIG. 7 and FIGS. 8 and 9 subsequent thereto, some of the transistors that are on are represented by an interconnect that couples both ends of the transistors. Some of the transistors that are off are shown by dashed lines or not shown.

With the transistor TN3 that is on, the transistor TN1 is diode-coupled. With the transistor TN4 that is on, the transistor TN2 is diode-coupled.

With the node TN5 that is on, the selected complementary bit line ⁻BL is coupled to the node SAt. With the transistor TN6 that is on, the selected bit line BL is coupled to the node SAc.

As shown in FIG. 6, a period from time t12 to time t13 is an offset cancellation period. At time t12, the signal EQ is negated. Thereby, pre-charging of the selected bit line BL and the selected complementary bit line ⁻BL ends.

At time t12, the signal ISO is negated, namely, the potential of the signal ISO is brought to the ground potential Vss. Thereby, the transistors TN5 and TN6 are turned off. FIG. 8 schematically shows coupling of the components of the sense amplifier circuit SAC during offset cancellation.

With the transistor TN5 that is off, the selected complementary bit line ⁻BL is decoupled from the node SAt, namely, isolated therefrom. With the transistor TN6 off, the selected bit line BL is decoupled from the node SAc, namely, isolated therefrom. Thus, the inverter circuit IV1 (i.e., transistors TP1 and TN1) and the inverter circuit IV2 (i.e., transistors TP2 and TN2) are not cross-coupled.

On the other hand, the node SAt is coupled to the selected bit line BL via the transistor TN3 that is turned on, as described above. Thus, the potential of the node SAt is transferred to the selected bit line BL, and the node SAt has a potential substantially the same as that of the selected bit line BL. With the transistor TN4 that is turned on, the node SAc is coupled to the selected complementary bit line ⁻BL. Thus, the potential of the node SAc is transferred to the selected complementary bit line ⁻BL, and the node SAc has a potential substantially the same as that of the selected complementary bit line ⁻BL.

As shown in FIG. 6, at time t12, the potential of the node SAP is brought to the power-supply potential Vddsa, and the potential of the node SAN is brought to the ground potential Vss.

With the end of pre-charging and the start of isolation at time t12, the potentials of the selected bit line BL and the selected complementary bit line ⁻BL change from the pre-charge potential (Vddsa/2). At this change, offset cancellation is performed through the action of the transistors TN3 and TN4 that are turned on. That is, the transistor TN1 is on by the transistor TN3, and thereby the ON resistance of the transistor TN1 is formed between the node SAt and the node SAN. Thus, a potential based on a ratio of the ON resistance of the transistor TP1 and the ON resistance of the transistor TN1 is generated at the node SAt. In general, a p-type MOSFET and an n-type MOSFET have different ON resistances, with the ON resistance of the n-type MOSFET being smaller than the ON resistance of the p-type MOSFET. Thus, the potential of the node SAt is not a median of a difference between the potential of the node SAP and the potential of the node SAN, but a potential lower than the median.

Also, the transistor TN2 is turned on by the transistor TN4, and thereby the ON resistance of the transistor TN2 is formed between the node SAc and the node SAN. Thus, a potential based on a ratio of the ON resistance of the transistor TP2 and the ON resistance of the transistor TN2 is generated at the node SAc. Thus, for a reason similar to that described above with reference to the node SAt, the potential of the node SAc is not a median of a difference between the potential of the node SAP and the potential of the node SAN, but a potential lower than the median.

With the change in potential of the node SAt caused by the offset cancellation, the potential of the selected bit line BL coupled to the node SAt via the transistor TN3 also changes. That is, the potential of the node SAt is reflected to the potential of the selected bit line BL. With the change in potential of the node SAc caused by the offset cancellation, the potential of the selected complementary bit line ⁻BL coupled to the node SAc via the transistor TN4 also changes. That is, the potential of the node SAc is reflected to the potential of the selected complementary bit line ⁻BL. One of the potentials of the selected bit line BL and the selected complementary bit line ⁻BL drops from the potential Vddsa/2 by a positive magnitude ΔV1, and the other potential drops from the potential Vddsa/2 by a positive magnitude ΔV2. A difference between ΔV1 and ΔV2 is generated by a difference (offset) in ON resistance between the transistor TP1 and the transistor TP2, and a difference in ON resistance between the transistor TN1 and the transistor TN2.

As described above, the difference between ΔV1 and ΔV2 is based on the difference in ON resistance between the transistor TP1 and the transistor TP2, and the difference in ON resistance between the transistor TN1 and the transistor TN2. Thus, at the start of the subsequent charge sharing, the node SAt has a potential based on the ON resistance of the transistor TP1 and the ON resistance of the transistor TN1, and the node SAc has a potential based on the ON resistance of the transistor TP2 and the ON resistance of the transistor TN2. With the nodes SAt and SAc having such potentials, the selected bit line BL and the selected complementary bit line ⁻BL are respectively charged. Based on the potentials of the selected bit line BL and the selected complementary bit line ⁻BL charged to such potentials, sensing is performed. A difference between the potential of the node SAt and the potential of the node SAc based on the difference in ON resistance between the transistors TP1 and TP2 and the difference in ON resistance between the transistors TN1 and TN2 might lead to deviation in potential between the selected bit line BL and the selected complementary bit line ⁻BL. On the other hand, through the offset cancellation, potentials based on the difference in ON resistance between the transistors TP1 and TP2 and the difference in ON resistance between the transistors TN1 and TN2 are respectively charged to the selected bit line BL and the selected complementary bit line ⁻BL via the node SAt and the node SAc prior to the sensing. Thus, at the time of sensing, the difference in ON resistance between the transistors TP1 and TP2 and the difference in ON resistance between the transistors TN1 and TN2 can be equivalently or effectively canceled (compensated for).

A period from time t13 to time t14 is a charge sharing period. At time t13, the potential of the node SAP is brought to the potential Vddsa/2, and the potential of the node SAN is brought to the potential Vddsa/2. As a result, the sense amplifier circuit SAC enters a state in which it cannot amplify the potentials.

At time t13, the signal OC is negated, namely, the potential of the signal OC is brought to the ground potential Vss. Thereby, the transistors TN3 and TN4 are turned off. At time t13, the signal ISO is asserted. Thereby, the transistors TN5 and TN6 are turned on. FIG. 9 schematically shows coupling of the components of the sense amplifier circuit SAC during charge sharing.

With the transistor TN3 that is off, the node SAt is decoupled from the selected bit line BL. On the other hand, with the transistor TN5 that is on, the node SAt is coupled to the selected complementary bit line ⁻BL.

With the transistor TN4 that is off, the node SAc is decoupled from the selected complementary bit line ⁻BL. On the other hand, with the transistor TN6 that is on, the node SAc is coupled to the selected bit line BL.

The transistor TN5 has a parasitic capacitance between the gate and drain. Due to this capacitance, when the potential of the gate of transistor TN5 rises and drops, the potential of the drain (the potential of the node SAt) can rise and drop, respectively. Similarly, the transistor TN6 has a parasitic capacitance between the gate and drain. Due to this capacitance, when the potential of the gate of the transistor TN6 rises and drops, the potential of the drain (the potential of the node SAc) can rise and drop, respectively.

Figure 10:
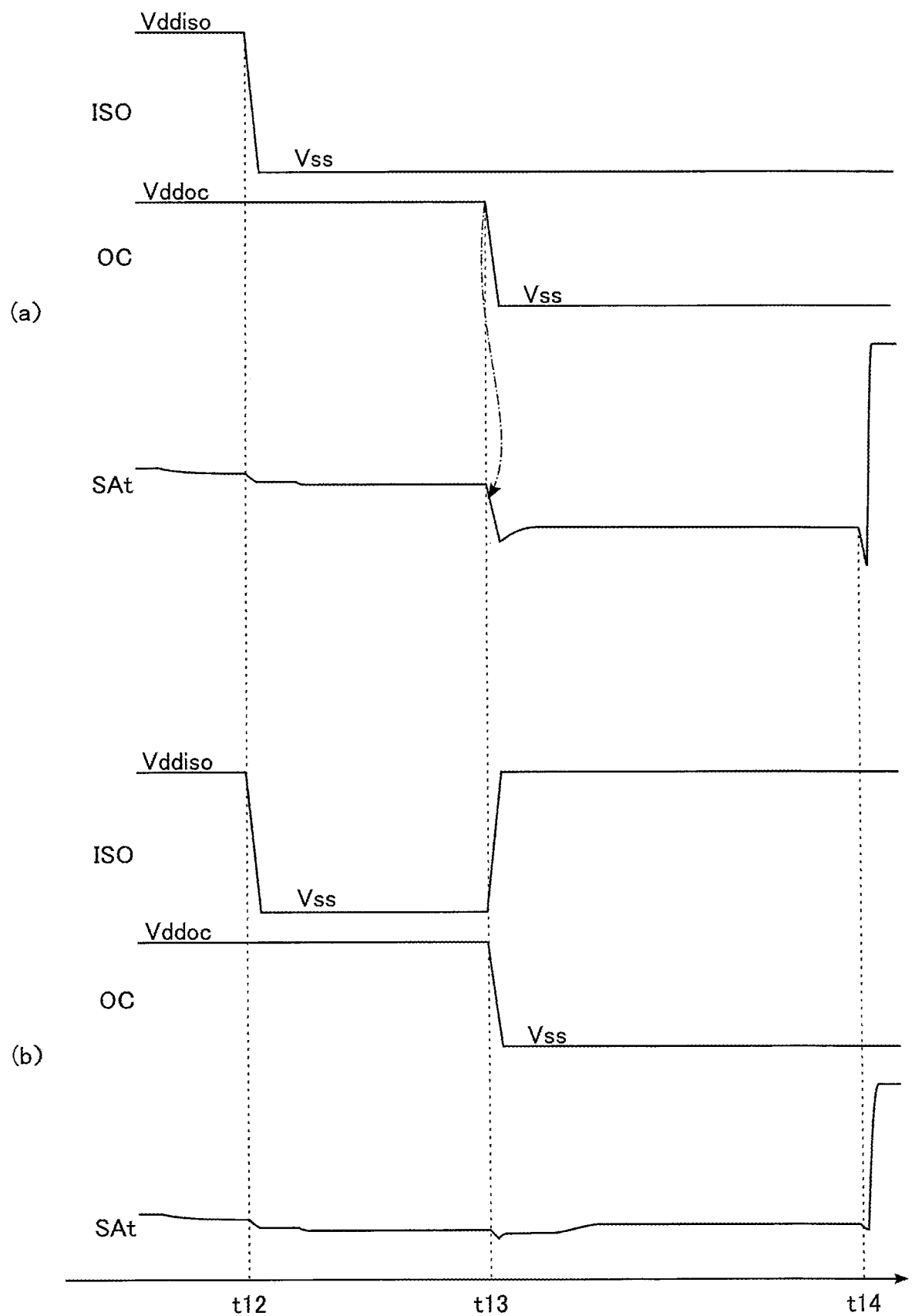
FIG. 10 schematically shows, along a timeline, potentials of some components of the memory device according to the first embodiment and of a memory device for reference, during data reading.

In addition, the transistor TN3 has a parasitic capacitance between the gate and drain. Due to this capacitance, the potential of the drain can decrease when the potential of the gate decreases as the potential of the signal OC is brought to the ground potential Vss at time t13. Thus, the potential of the node SAt can decrease as the potential of the signal OC decreases. On the other hand, as described above, the increase in potential of the signal ISO at time t13 raises the potential of the node SAt through the parasitic capacitance between the gate and drain of the transistor TN5. Thus, the decrease in potential of the node SAt due to the decrease in potential of the signal OC at time t13 is suppressed by the increase in potential of the signal ISO. For example, if a parasitic capacitance between one of the source and drain of the transistor TN5 and its gate is substantially the same as a parasitic capacitance between one of the source and drain of the transistor TN3 and its gate, a magnitude by which the potential of the node SAt decreases due to the decrease in potential of the signal OC and a magnitude by which the potential of the node SAt increases due to the increase in potential of the signal ISO are substantially the same. Thus, at time t13, the potential of the node SAt is almost the same as that immediately before time t13. The change in potential of the node SAt is shown in FIG. 10, and FIG. 10 will be described later.

Similarly, the transistor TN4 has a parasitic capacitance between the gate and drain. Due to this capacitance, the potential of the drain can decrease when the potential of the gate decreases as the potential of the signal OC is brought to the ground potential Vss at time t13. Thus, the potential of the node SAc can decrease as the potential of the signal OC decreases. On the other hand, as described above, the increase in potential of the signal ISO at time t13 raises the potential of the node SAc through the parasitic capacitance between the gate and drain of the transistor TN6. Thus, the decrease in potential of the node SAc due to the decrease in potential of the signal OC at time t13 is suppressed by the increase in potential of the signal ISO. For example, if a parasitic capacitance between one of the source and drain of the transistor TN6 and its gate is substantially the same as a parasitic capacitance between one of the source and drain of the transistor TN4 and its gate, a magnitude by which the potential of the node SAc decreases due to the decrease in potential of the signal OC and a magnitude by which the potential of the node SAt increases due to the increase in potential of the signal ISO are substantially the same. Thus, at time t13, the potential of the node SAc is almost the same as that immediately before time t13.

Further, at time t13, the selected word line WL is asserted. This initiates the charge sharing. The charge sharing allows a charge stored in the selected bit line BL and a charge stored in the storage node SN of the selected memory cell MC to be shared. As a result, the potential of the selected bit line BL rises or drops based on the data stored in the selected memory cell MC. The potential of the selected bit line BL (and the storage node SN) enters a state of having a magnitude of when the potential of the selected bit line BL and the potential of the storage node SN become equal.

In the 0-data storage case, the potential of the selected bit line BL drops toward the potential of the storage node SN, and the potential of the storage node SN rises toward the potential of the selected bit line BL. The selected bit line BL and the storage node SN enter a state of having a potential VB0 of a magnitude of when the dropping potential of the selected bit line BL and the rising potential of the storage node SN become equal. The potential of the selected complementary bit line ⁻BL is maintained.

On the other hand, in the 1-data storage case, the potential of the storage node SN drops toward the potential of the selected bit line BL, and the potential of the selected bit line BL rises toward the potential of the storage node SN. The selected bit line BL and the storage node SN enter a state of having a potential VB1 of a magnitude of when the rising potential of the selected bit line BL and the dropping potential of the storage node SN become equal. The potential of the selected complementary bit line ⁻BL is maintained.

The selected bit line BL is coupled to the node SAc via the transistor TN6 that is on. Thus, the potential of the node SAc follows the potential of the selected bit line BL. The selected complementary bit line ⁻BL is coupled to the node SAt via the transistor TN5 that is on. Thus, the potential of the node SAt follows the potential of the selected complementary bit line ⁻BL.

A period from time t14 and thereafter is a sensing and restoring period. At time t14, the potential of the node SAP is brought to the power-supply potential Vddsa, and the potential of the node SAN is brought to the ground potential Vss. As a result, the sense amplifier circuit SAC enters a state in which it can amplify the potentials. The sense amplifier circuit SAC amplifies one of the potentials of the node SAt and the node SAc to reach the power-supply potential Vddsa and the other to reach the ground potential Vss. The potential of the node SAt is transferred to the selected complementary bit line ⁻BL via the transistor TN5. The potential of the node SAc is transferred to the selected bit line BL via the transistor TN6. Thus, the potential of the selected bit line BL and the potential of the selected complementary bit line ⁻BL rise or drop. In the 0-data storage case, the potential of the selected bit line BL drops to the ground potential Vss, and the potential of the selected complementary bit line ⁻BL rises to the power-supply potential Vddsa. On the other hand, in the 1-data storage case, the potential of the selected bit line BL rises to the power-supply potential Vddsa, and the potential of the selected complementary bit line ⁻BL drops to the ground potential Vss.

1. 3. Advantages (Effects)

According to the first embodiment, it is possible to provide a memory device capable of determining data stored in memory cells with high reliability, as described below.

For comparison, a memory device for reference will be described. A memory device 100 for reference (not shown) includes the sense amplifier circuit SAC of the memory device 1. On the other hand, the memory device 100 differs from the memory device 1 in terms of changes in potential of certain interconnects.

FIG. 10 schematically shows, along a timeline, potentials of some components of the memory device of the first embodiment and of the memory device for reference during data reading, showing potentials of signals and nodes. FIG. 10 shows, in part (a), potentials of signals and a node of the memory device 100 and, in part (b), potentials of an interconnect, a node, and signals of the memory device 1.

In the memory device 100, a potential of a signal ISO is maintained at a ground potential Vss at time t13. As described with reference to FIG. 6, the potential of the node SAt decreases as the potential of the signal OC is brought to the ground potential Vss at time t13. The potential of the node SAt quickly decreases from time t13 and remains decreased thereafter. However, the potential of the node SAt as of the end of offset cancellation, i.e., immediately before time t13, is desirably maintained after time t13. An unintentional decrease in potential of the node SAt can interfere with an intended operation of the sense amplifier circuit SAC and can cause the following phenomena.

During the charge sharing following the offset cancellation, one of the nodes SAt and SAc must have a higher potential than the other based on the data stored in the selected memory cell MC. In the 0-data storage case, the node SAt needs to have a higher potential than that of the node SAc. However, a decrease in potential of the node SAt can increase a degree to which the transistor TP2 is on and increase the potential of the node SAc. As a result, in some cases, the potential of the node SAt can fall below the potential of the node SAc. If the potential of the node SAt falls below the potential of the node SAc, as a result of sensing, the sense amplifier circuit SAC forms a state formed when the selected memory cell MC stores "1" data. This means erroneous reading of the data stored in the selected memory cell MC.

In the memory device 1 of the first embodiment, the signal ISO is brought to a high level (potential Vddiso) at the end of offset cancellation, i.e., at substantially the same timing at which the signal OC is brought to a low level (ground potential Vss). Thus, the decrease in potential of the node SAt due to the decrease in potential of the signal OC at time t13 is suppressed by the increase in potential of the signal ISO. Therefore, as shown in part (b) of FIG. 10, at time t13, the potential of the node SAt is almost the same as that immediately before time t13. For this reason, it is more difficult for the potential of the node SAt to fall below the potential of the node SAc in the 0-data storage case than in the case of the memory device 100. Thus, the memory device 1 can read data from the selected memory cell MC with higher reliability than the memory device 100.

1. 4. Modification

In the above, as an example of the basic form of the first embodiment, a case has been described in which the signal ISO is raised at substantially the same time as the time of falling of the signal OC. The time of rising of the signal ISO and the time of falling of the signal OC do not have to be the same as long as the sense amplifier circuit SAC can suppress malfunctions, especially the potential of the node SAt falling below the potential of the node SAc after offset cancellation is completed in the storage case. For example, as shown in FIG. 11, the signal ISO may be raised immediately before falling of the signal OC. Alternatively, the signal ISO may be raised after falling of the signal OC. In this case, as shown in FIG. 12, the rising of the signal ISO is closer to time t13 when the signal OC falls than to the time when the sense amplifier circuit SAC is enabled to perform amplification (i.e., time t14). That is, the rising of the signal ISO is closer to time t13 than to time t13', which is halfway between time t13 and time t14. However, the time of rising of the signal ISO is preferably closer to the time of falling of the signal OC in order to suppress the malfunctions of the sense amplifier circuit SAC to a greater extent.

The sense amplifier control circuit 181 is not limited to the components and coupling shown in FIG. 4. The sense amplifier control circuit 181 may have any components and coupling as long as it outputs a signal ISO that rises due to falling of a signal OC. For example, while the signal ISOx rises based on falling of the signal OCx, rising of the signal OCx and falling of the signal ISOx may originate from separate signals instead of originating from a common signal ACT as in the example in FIG. 4. Further, the inverter circuits IV1, IV2, IV3, and IV4 are used to adjust the timing of the falling of the signal OC and the rising of the signal ISO. The number of inverters between the output of the NAND gate ND1 and the node transmitting the signal ISO may be any even number, and may even be zero. Likewise, the number of inverters between the output of the pulse generation circuit PG and the node transmitting the signal OC may be any even number, and may even be zero.

The description that the potential of an element is changed at a certain time does not require that the change in potential take place at a time exactly coinciding with this time. For example, at time t14, the potentials of the nodes SAP and SAN are described as being brought to the power-supply potential Vddsa and the ground potential Vss, respectively, but the change in one potential may go back and forth within an error margin from the change in the other potential.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory device comprising:
a capacitor;
a first transistor coupled to the capacitor at a first end;
a first inverter circuit coupled between a first node and a second node and including a p-type second transistor and an n-type third transistor that are coupled in series at a third node;
a second inverter circuit coupled between the first node and the second node and including a p-type fourth transistor and an n-type fifth transistor that are coupled in series at a fourth node;
a sixth transistor coupled between a gate of the fifth transistor and the third node;
a seventh transistor coupled between a gate of the third transistor and the fourth node and between a second end of the first transistor and the fourth node;
an eighth transistor coupled between the gate of the third transistor and the third node;
a ninth transistor coupled between the gate of the fifth transistor and the fourth node;
a first circuit that supplies a first signal that falls at a first time or a second signal obtained by delaying the first signal to a gate of the eighth transistor and a gate of the ninth transistor; and
a second circuit that supplies a third signal that rises based on falling of the first signal or a fourth signal obtained by delaying the third signal to a gate of the sixth transistor and a gate of the seventh transistor, the second circuit includes a NAND gate that receives the first signal at a first input and outputs the third signal.

2. The memory device according to claim 1, wherein the first circuit includes a pulse generation circuit that outputs the first signal of a first level from a second time to the first time.

3. The memory device according to claim 2, further comprising a delay circuit that, upon receiving a fifth signal, outputs a sixth signal obtained by delaying the fifth signal, wherein the NAND gate receives the sixth signal at a second input, and the pulse generation circuit outputs the first signal of the first level from the second time to the first time upon receiving the fifth signal before the second time.

4. The memory device according to claim 3, wherein the first circuit includes a first number of inverter circuits that are coupled in series, receives the first signal, and outputs the second signal, the first number being an even number, and the second circuit includes inverter circuits that are coupled in series, receives the third signal, and outputs the fourth signal, the inverter circuits being equal in number to the first number of inverter circuits.

* * * * *